United States Patent

[11] 3,584,654

| [72] | Inventor | Jean-Louis Deloye<br>14 Rue Anatole, 13 Arles (Bouches du Rohne), France |
|---|---|---|
| [21] | Appl. No. | 729,962 |
| [22] | Filed | May 17, 1968 |
| [45] | Patented | June 15, 1971 |
| [32] | Priority | May 19, 1967 |
| [33] | | France |
| [31] | | 107/31 |

[54] SANITARY MIXING FAUCET
8 Claims, 4 Drawing Figs.

[52] U.S. Cl. .................................................... 137/637.2,
4/194, 137/606, 251/229
[51] Int. Cl. ..................................................... F16k 19/00
[50] Field of Search .......................................... 137/637.2,
606; 4/192, 194; 251/229, 273

[56] References Cited
UNITED STATES PATENTS

| 2,980,141 | 4/1961 | Brinkman...................... | 137/637.2 |
| 682,453 | 9/1901 | Bunting, Jr. ................... | 4/194 |
| 1,684,651 | 9/1928 | Wayman et al. ............... | 251/229 X |
| 2,633,872 | 4/1953 | Hennessey...................... | 137/606 X |

FOREIGN PATENTS

| 539,659 | 9/1941 | Great Britain................ | 137/637.2 |

*Primary Examiner*—Robert G. Nilson
*Attorney*—Hutchinson & Milans

ABSTRACT: The present disclosure relates to a mixing faucet construction adapted for use in wash basins, kitchen sinks, and the like, wherein the knobs or control handles for the hot and cold water valves, as well as the control knob for the drain outlet, are grouped in a novel manner and superposed in vertical alignment on a single common axis. By virtue of the novel arrangement of elements the hot and cold water control knobs may be actuated together, or independently of each other, as desired, by one hand and by employing a conventional turning motion. The novel associated control elements for the valve stems are contained within a housing unit located outside the normal water mixing chamber of the faucet and can be easily removed as a unit from the main housing body by unscrewing a single retaining element for servicing of the parts.

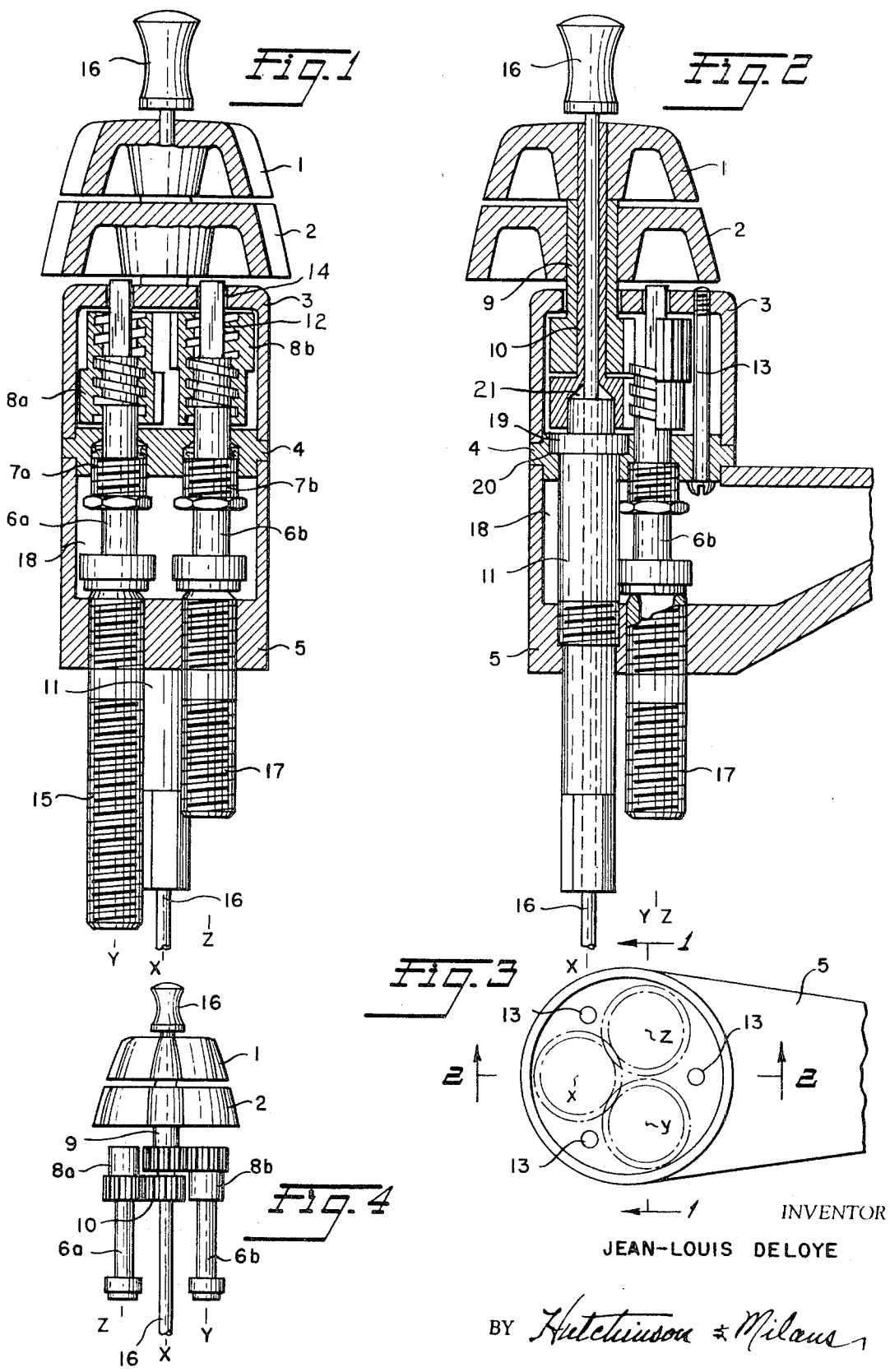

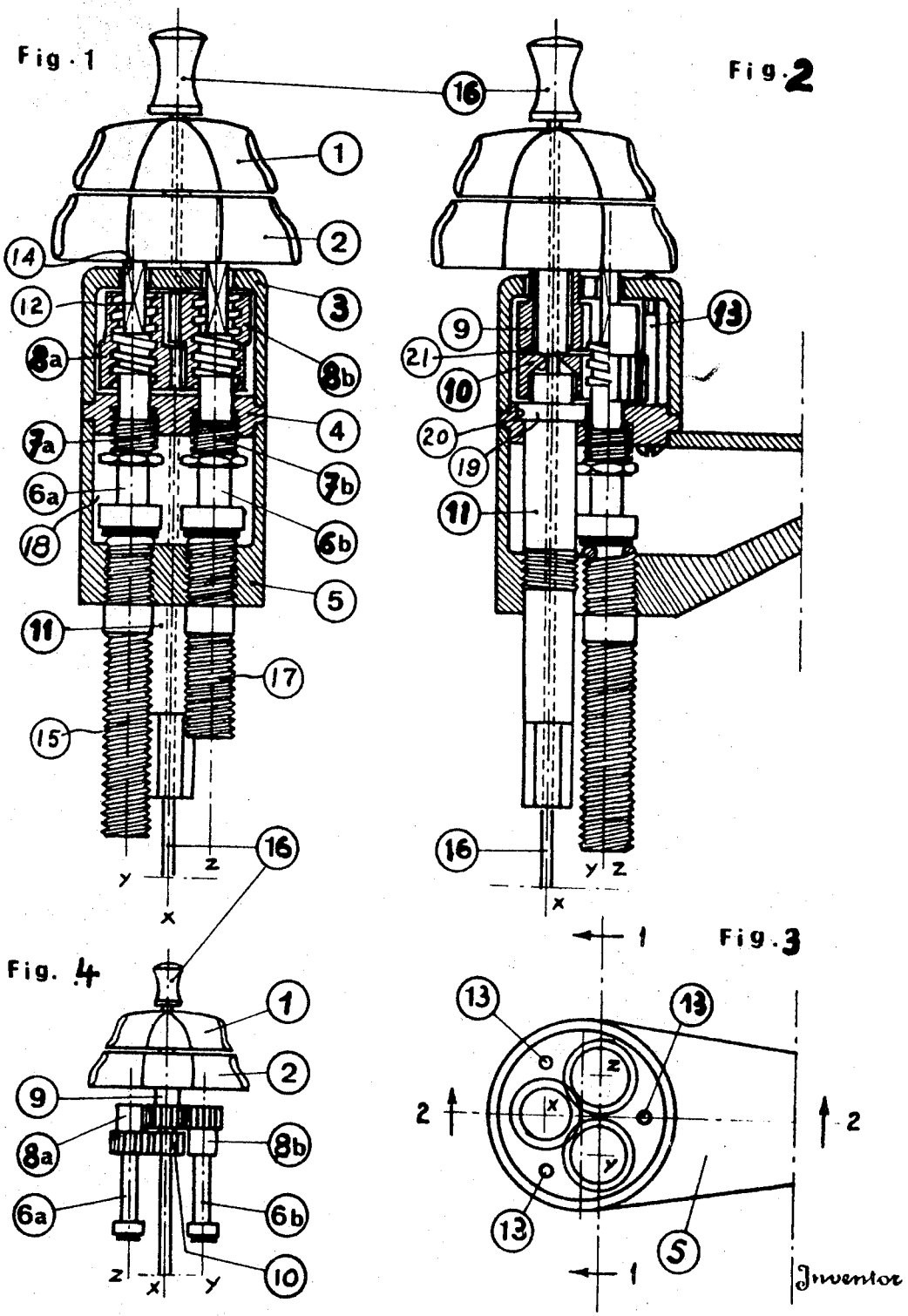

SANITARY MIXING FAUCET

The present invention relates to plumbing equipment and more particularly to a mixing type of faucet construction for any desired purpose, such as for use in wash basins, kitchen sinks, bathtubs, or the like, wherever a desired flow of cold water, hot water, or water mixed to a desired temperature, is precisely regulated at all times.

The novelty in the said faucet construction resides in the fact that all of the above-mentioned operations can be accomplished with the use of one hand, and employing the same motions that are required in the operation of a conventional faucet construction. The construction embodies two conventional faucet controls mounted side by side in a single body and assembled in such a way that their respective control knobs are mounted one above the other on the same vertical axis, independently of each other. This particular disposition of the control knobs and associated elements, permits manipulation of each faucet control separately to control delivery of either hot or cold water, independently of each other. At the same time it is possible, by virtue of the construction, to manipulate both control knobs simultaneously by straddling the control knobs with the fingers of the hand, thus securing warm water, namely hot and cold water mixed.

It is therefore the primary object and chief characteristic of this invention to provide a new and improved form of mixing faucet of relatively few parts and simple construction which will result in an assembly which is readily operable to produce any desired ratio of the mixing fluids and wherein the hot and cold water control knobs are juxtaposed on a single vertical axis and employing independent control mechanisms for actuating the respective valves.

In the preferred embodiment of the invention, the two control knobs or handles are fixed on two telescopically arranged shafts which are provided at their ends with gears, each of which mesh with a cooperating sleeve that is likewise provided with a gear element and is internally threaded to receive the threaded portion of the valve stem. The rotation of this last mentioned sleeve is thus effected by the turning of the knob or control handle, to thus raise and lower or hold the valve stem in the desired position.

Other and further objects and advantages of the present invention will become apparent from the following description and the appended claims, reference being had to the accompanying drawings forming a part of this specification. The invention may be embodied in the form illustrated in the drawings, attention being called to the fact, however, that the drawings are illustrative only, and that changes may be made in the specific constructions illustrated and described, so long as the scope of the appended claims is not violated.

BRIEF DESCRIPTION OF THE DRAWINGS

In the accompanying drawings which form a part of this application,

FIG. 1 is a vertical sectional view through the sanitary mixing faucet of my invention taken on the line 1-1 of FIG. 3 looking in the direction of the arrows and showing the two valve stems and their associated actuating sleeve devices;

FIG. 2 is a vertical sectional view through the mixing faucet housing on the line 2-2 of FIG. 3, with a partial section along the axis y in front of the line 2-2;

FIG. 3 is a schematic top plan view of the mixing faucet with the housing cover removed to show the three axes x, y and z on which the various elements constituting the operating mechanism are positioned; and FIG. 4 is a schematic view in vertical elevation illustrating the general operational characteristics of my novel sanitary mixing faucet.

Like characters of reference are used throughout the following specification and the accompanying drawings to designate corresponding parts.

DESCRIPTION OF THE PREFERRED EMBODIMENT

Referring to the accompanying drawing, there is shown a preferred embodiment of my invention in a mixing faucet construction. FIG. 4 is a schematic disclosure presenting the general operating principles of the faucet controls. In this FIG. and in FIG. 2 control knobs or handles 1 and 2 are shown mounted on telescopically disposed shafts 10 and 9, respectively. Each of these shafts terminate at their lower ends in toothed gears which mesh with cooperating gears carried by sleeves 8a and 8b.

Rotation of the knobs 1 and 2 will cause rotation of sleeves 8a and 8b, respectively, and the rotation of the sleeves will actuate the vertical movement of the valve stems 6a and 6b. It will be explained hereinafter how the various elements are associated and held within the housing unit and how the valve stems are kept from rotating or turning along with the sleeves.

The mechanism employed is mounted about three axes x, y and z, their respective positions being diagrammatically shown in FIG. 3.

Referring to FIG. 1, it will be seen that this is a sectional view along a plane that passes through axes y and z, taken on the line 1-1 of FIG. 3 looking in the direction of the arrows. The inlet connections 15 and 17 for the hot and cold water lines are threadedly received in the body 5 of the faucet, as shown, and their inner ends open into the mixing chamber 18 of the faucet body and are suitably opened and closed by the vertical movement of the valve stems 6a and 6b.

The mechanical assembly that actuates and controls the valve stems, and of which the valves are a part, comprise a homogeneous group, all of whose members are held in place by the housing cover 3 and base 4. The housing cover and base 4 are fixed to each other in watertight relationship by suitable through bolts 13. This assembly unit constitutes the faucet head and it is held fixed on faucet body 5 by a tubular piece 11 having a retaining flange 19 fitting in a shouldered recess 20 in the base 4. The lower portion of piece 11 extends downwardly through the mixing chamber beneath the body 5. Preferably the piece 11 is threadedly received through the body 5, as shown, and the lower end of the piece is hexed to receive a wrench to facilitate screwing the piece 11 into retaining position.

When the piece 11 is unscrewed, the faucet head is freed as a unit from the body 5 and can then be lifted away from the body affording easy access to the parts of the unit for servicing the valves, joints, packing sleeves 7a and 7b and the replacement of washers carried by the valve stems.

It will be understood that the valve stems 6a and 6b extend into the housing unit through the screw-threaded packing member 7a and 7b, and the upper portions of said stems are provided with threaded portions which engage corresponding internal threading in the sleeves 8a and 8b, as shown. Rotation of these sleeves will control the upward or downward movement of the valve stems. To prevent rotation of the valve stems upon rotation of the sleeves, the upper ends 12 of the stems are formed square in cross section and slidingly extend through square openings 14 in housing 3.

Sleeves 8a and 8b are prevented from upward or downward movement by being confined and retained between the housing top wall 3 and the base 4.

FIG. 2 is a sectional view taken on two different planes, a principal section along the axis of the faucet through the axis x, on the line 2-2 of FIG. 3, and a partial section along axis y which is taken in front of the principal section. Control knob 1 is fixed to and actuates shaft 10 and control knob 2 is fixed to and actuates shaft 9. Preferably knob 1 is fitted onto the square end of its shaft 10.

Shaft 10 is provided with an internal bore through which basin drain actuating rod 16 extends, as hereinafter explained. This bore opens into a internal conically shaped seat and recess 21 at the lower end of the shaft 10. This conical recess is adapted to receive the upper conically shaped end of the tubular piece 11, upon which the shaft 10 can freely rotate in operation. Shaft 10, being rotated by turning of knob 1, and being provided with an external gear element at its lower end in mesh with the cooperating gear of sleeve 8a, will transmit rotation to said sleeve, which will in turn move valve stem 6a upward or downward, as the case may be.

The upper part of sleeve 8a, being of less diameter and devoid of teeth, will allow clearance for and passage of the teeth of the gear on adjacent sleeve 8b. Sleeve 8b is identical in construction with 8a but is positioned in opposite direction to mesh with the gear on shaft 9 which is integral with lower knob 2.

To avoid unnecessary friction, shaft 10 resting and turning on the conical head of piece 11, will be so designed that the knob 1 will be held above the lower knob 2 without any contact between the adjacent surfaces.

With shaft 10 and piece 11 being tubular in construction or suitably bored, a passageway is provided along the axis $x$ for a rod 16, provided with an actuating knob at its upper end, to control the outflow from the sink or wash basin.

By virtue of the described embodiment of the invention, it will be appreciated that a mixing faucet is provided in which two conventional valves control two distinct inlets, one for hot water and the other for cold, placed side by side in a single faucet body. The two valves are actuated by two juxtaposed knobs, one mounted above the other about the same vertical axis. The knobs can be actuated separately, or together, by a single motion of the hand. With the fingers straddling the knobs, both knobs are turned, and when only one is grasped with the fingers, the other knob is not moved.

The valve stems passing through the screw-threaded gland seals in the base 4 of the housing unit can move axially therein but not rotatively since their upper squared ends slide in squared openings in the housing 3. The threaded sleeve gears 8a and 8b are held from axial movement by the confining upper and lower walls of the housing unit, and are rotated by the toothed annular members of the knob shafts 9 and 10. The upper knob 1, which has the longer shaft 10, forms therewith an assembly that rests on the bottom of the housing and bears on the centering piece 11. The lower knob 2 is integral with the tubular shaft 9 and turns about the other shaft 10. The lower end surface of shaft 9 rests on the upper surface of the gear of shaft 10 and is confined above by the top wall of the housing, so that the two telescoping shaft-knob assemblies have the least possible frictional contact therebetween.

The members of the mechanical assembly that joins the knobs to the valve stems are all grouped in a sealed housing unit that constitutes the faucet head, which, as a unit, is removably fixed to the main faucet body 5 by a single piece 11. Unbolting or unscrewing of the single piece 11 is all that is necessary to release the faucet head so that it may be taken in hand and removed from the faucet body to facilitate servicing of the joints, packings, and other parts.

While the present invention has been explained and described with reference to a specific embodiment of structure, it will be understood, nevertheless, that numerous modifications are variations are susceptible of being incorporated without departure from the essential spirit or scope thereof.

I claim:

1. A mixing faucet control unit adapted to be removably associated with a main faucet body provided with hot and cold water inlets, valve seats and a water mixing chamber leading to a dispensing tap, said control unit comprising
    a housing unit including a base adapted to fit onto said main faucet body and cover said water mixing chamber in watertight relationship,
    valve stems carried by and extending through said base into the water-mixing chamber for axial movement toward and away from said valve seats,
    superposed control knobs disposed outside said housing unit and fixed to control shafts extending into said unit with said control shafts being concentrically disposed with reference to each other,
    valve stem actuating means disposed within said housing unit adjacent to said control shafts said valve stem actuating means comprising sleevelike elements confined against axial movement by said housing unit,
    cooperating means carried by said control shafts and said valve stem actuating means disposed within said housing unit and comprising intermeshing gearlike elements carried by said control shafts and said valve stem actuating means for effecting rotation of said sleevelike elements upon rotation of said control shafts,
    means also disposed within said unit for effecting axial movement of said valve stems upon movement of said valve stem actuating means, and
    means for removably securing said housing unit in place upon said main faucet body in sealed fluidtight relationship.

2. A mixing faucet control unit as defined in claim 1 wherein said means for removably securing said housing unit in place upon said main faucet body comprises a single element.

3. A mixing faucet control unit as defined in claim 2 wherein said single element comprises a tubular bolt extending through said base and said faucet body.

4. A mixing faucet control unit as defined in claim 1 wherein said superposed control knobs and their respective control shafts are disposed about a single common axis, with the control shafts telescopically positioned with reference to each other.

5. A mixing faucet control unit as defined in claim 4 wherein said control shafts are of tubular construction and said securing means for the housing unit is of tubular construction and being disposed about a single common axis, so that a basin drain control member may be passed through the control shafts and securing means along said common axis.

6. A mixing faucet control unit as defined in claim 1 wherein said means for effecting axial movement of said valve stems upon movement of said valve stem actuating means comprises cooperative threaded means carried by said sleevelike elements and their respective associated valve stems.

7. A mixing faucet control unit as defined in claim 6 wherein said valve stems are provided with means for preventing their rotation whenever said sleevelike elements are rotated by said control shafts.

8. A mixing faucet control unit as defined in claim 1 wherein all elements of said control unit are disposed along three vertically positioned axes: the control knobs, control shafts and removably securing means being disposed about a first axis; one fluid inlet, valve seat, valve stem and valve stem actuating means disposed about a second axis; and the other fluid inlet, valve seat, valve stem and valve stem actuating means disposed about a third axis.